United States Patent [19]

Bagby

[11] 3,778,896

[45] Dec. 18, 1973

[54] BONDING AN INSULATOR TO AN INORGANIC MEMBER

[75] Inventor: John F. Bagby, Glendora, Calif.

[73] Assignee: Bell & Howell Company, Pasadena, Calif.

[22] Filed: May 5, 1972

[21] Appl. No.: 250,544

[52] U.S. Cl. ................. 29/603, 29/471.9, 29/472.9, 219/10.53

[51] Int. Cl. ............................ G11b 5/42, H01f 7/06

[58] Field of Search ................ 29/603, 472.9, 497.5, 29/471.9; 204/16; 156/272; 219/10.53

[56] References Cited

UNITED STATES PATENTS

| | | | |
|---|---|---|---|
| 3,256,598 | 6/1966 | Kramer et al. | 156/272 X |
| 3,397,278 | 8/1968 | Pomerantz | 156/272 X |
| 3,417,459 | 12/1968 | Pomerantz et al. | 29/472.9 |
| 3,479,738 | 11/1969 | Hwak | 29/603 |
| 3,506,424 | 4/1970 | Pomerantz | 156/272 X |
| 3,589,965 | 6/1971 | Wallis et al. | 156/272 |
| 3,672,045 | 6/1972 | Robertson | 29/603 |

*Primary Examiner*—Robert D. Baldwin
*Assistant Examiner*—Ronald J. Shore
*Attorney*—Robert Berliner

[57] ABSTRACT

A method for joining an insulator to another member of poor electrical conductivity. The latter member is formed with a metal surface for contact with the insulator in a Mallory type bonding process wherein a potential is applied across the contact surfaces while heating below a molten state. In particular embodiments, the poor electrical conductor is a ferrite sputtered with metal to form the bonding surface and the method is used to manufacture a ferrite magnetic head having pole tips separated by a gap filled with a glass insulator. In other embodiments, a very thin layer of insulator is made more suitable for Mallory type bonding by RF sputtering onto a substrate from a target which is cooled by disposing a heat conductor between the target and the RF electrode. Mallory bonding of the thin insulator layer is enhanced by a reversal of polarity of the applied potential following a decrease in electric current flow.

26 Claims, 5 Drawing Figures

BONDING AN INSULATOR TO AN INORGANIC MEMBER

FIELD OF THE INVENTION

The fields of art to which the invention pertains include the field of surface bonding, particularly non-metal to metal and non-metal to non-metal and the field of ferrite magnetic recording/playback heads, more particularly to an improved method of making ferrite heads having very small gap lengths.

BACKGROUND AND SUMMARY OF THE INVENTION

The high magnetic permeability and low electrical conductivity of ferrites have enabled this class of materials to be used as cores for magnetic transducer heads, particularly for recording and reproducing short wavelength signals on magnetic tape. Such cores include a pair of poles separated at their tips by an accurately defined gap. During recording or playback, magnetic tape is transported over the running surface of the head in a direction parallel to the gap length (i.e., the distance between the pole tips) in magnetic contact with the poles. In order to counteract the brittleness of polycrystalline ferrite materials it is conventional to mechanically support the ferrite materials at the pole tips by filling the gap with a non-magnetic, wear-resistant, structural material, such as glass. Since the extent of the support afforded by the glass gap material is greatly influenced by the integrity of the ferrite-to-glass interface, it is generally agreed that the gap material should be intimately bonded to the ferrite pole tips and that the useful life of the head is directly related to the success in forming the bond.

A variety of prior methods have been developed for forming bonds between the ferrite and glass, such as by inserting a glass-forming powder or glaze, or a glass plate, between the confronting surfaces of the two ferrite members and heating the assembly to fuse the glass while the two members are moved toward one another until the desired gap length is attained. In other methods, gaps of capillary dimensions are achieved by separating the two ferrite members by a distance equal to the desired gap length and heating a quantity of glass adjacent the gap whereby to draw the glass into the gap by capillary action. Such methods define the gap length indirectly and depend for their accuracy on achieving precise flatness along very extended regions of the pole faces adjacent the region. They furthermore require a plurality of machining steps, each with accurate alignment, to assure the proper disposition of gap and spacer locations and are wasteful when it is desired to produce single gap heads.

The foregoing methods do not in fact eliminate the problem of pole tip deterioration through chipping and crystal breakout. Even the most dense ferrite materials include pores in the gap face which are not usually filled by the glass and such pores further affect to some extent the integrity of the fusion bond. Furthermore, physical limits on the foregoing processes provide a practical lower limit of commercially producible gap length. Of course, the smaller the gap length, the shorter the wavelength which can be reproduced from a recorded medium.

The present invention provides a method for intimately bonding glass or other insulator material between the pole faces of a ferrite head in which many of the foregoing problems are alleviated. In particular, a method is provided for obtaining ferrite heads of exceedingly small gap length, on the order of 5-100 microinches, while simplifying the construction of the heads. The gap length is determined at the gap itself eliminating the need for accurately machined adjacent regions.

The present invention has broader application than to the manufacture of magnetic heads and can be used to join any insulator member to a member of a poor electrical conductivity. In brief terms, the method involves depositing metal on the poor conductor so as to form an intimately bonded metal surface thereon which is then juxtaposed in surface contact relationship with the insulator member. Thereafter, a Mallory type process is utilized to intimately bond the insulator material to the metal surface. The Mallory process is described in U.S. Pat. Nos. 3,417,459, 3,397,278 and 3,506,424 to Pomerantz and others. The process utilizes electrostatic force to bond glass and metal. The juxtaposed surfaces of the materials are heated to a temperature below the softening point of the materials but sufficiently to increase substantially the electrical conductivity of the insulator. Simultaneously, an electric potential is applied across the juxtaposed surfaces sufficient to produce a finite electric current therethrough without rendering the insulator material molten. As a result of ion polarization, and the small distances involved, moderate voltages produce extremely high electrostatic fields in the surface regions resulting in an electrostatic attraction between the materials to produce an intimate, permanent bonding of the materials.

In specific embodiments, the present invention is applied to the production of ferrite heads having very small gap lengths. In this embodiment, metal is sputtered onto at least one of the pole faces to provide a metal surface for Mallory type bonding to the glass gap material. The glass material is applied to the other pole face to a thickness corresponding to the desired gap length by sputtering from a target of the glass material juxtaposed with a radio-frequency (RF) electrode. The glass and metal surfaces are then brought into contact and a suitable potential is applied while heating, as above described, to effect an intimate bonding of the materials. Since the glass gap material is not melted during the process, the gap length can be very accurately controlled. Sputtering of the glass material onto one of the pole pieces, enables extremely small gap lengths, selected in the range of about 5–100 microinches to be obtained. The glass forming the gap has fewer pores than glass-filled gaps produced by the prior art methods and the pores in the ferrite surfaces are more nearly filled with glass due to the high impact process by which the sputtered particles strike the ferrite and the plural angles of incidence. Moreover, it is believed that the high impact of the glass particles causes the particles to be embedded below the surface of the ferrite (perhaps to the thickness of a few molecules), contributing to the production of an intense bond between the glass and the ferrite. Similar effects are obtained with the metal sputtered onto the other pole face. The Mallory type joining of the glass and metal permanently integrates the components.

While the process as previously described can be utilized to glass bond the ferrite pole pieces, the present invention provides certain techniques which can be used to produce an extremely tenacious bond wherein upon breaking the bonded ferrite structure, cleavage occurs in the ferrite material, or in the gap material, but not in the glass-ferrite juncture. One of these techniques relates to the sputtering of the glass gap material onto the pole face and includes the step of cooling the glass target during sputtering. This can be accomplished by disposing a number of heat conductive members between the radio-frequency electrode and the target.

Another technique is particularly useful with very small gap lengths. During application of an electric potential across such thin gap material, it is found that as the flow of current through the juncture decreases, the voltage becomes erratic. While it is not desired to be limited to any particular theory, the voltage breakdown may be as a result of a lack of sufficient dielectric resistance in the very thin gap material. The result can be a spotty juncture with uneven resistance to cleavage. In accordance with another embodiment of this invention, these effects can be overcome by reversing the polarity of the electric potential after the magnitude of the electric current has decreased. Following such reversal, it is observed that the magnitude of electric current is substantially restored. The potential can again be reversed after a decrease in this latter current.

DETAILED DESCRIPTION

The drawings utilized herein are schematic and serve only to illustrate the method steps of the invention; therefore, relative sizes and positions are not to be taken literally but are used only for convenience and ease of illustration.

Figure 1:
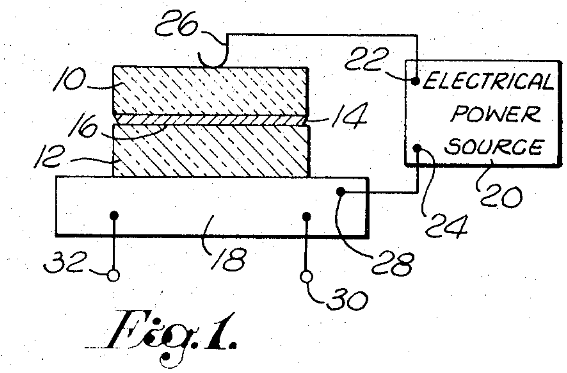
FIG. 1 is a diagrammatic cross-sectional, side view illustrating the bonding of an insulator member to another member of poor conductivity having an intimately bonded metal surface thereon, in accordance with the general concepts of the present invention.

FIG. 1 illustrates a general application of the process wherein a member 10 formed of material having poor conductivity is permanently joined to an insulator member 12. Initially, a layer 14 of metal is intimately bonded to the bottom surface of the poor conductivity member 10 and is then brought into close surface contact with the insulator member 12 to form an interface 16 therebetween. The assembly is placed on a conductive platen 18 for heating the insulator member 12.

An electric power source 20, which may be a simple direct current power source having output terminals 22 and 24, is connected across the assembly. For example, the electrical connection can be made to the poor conductive member 10 through a spring contact 26 connected to the terminal 22. Electrical contact to the insulator member can be made via the platen 18 which has a terminal 28 connected to the terminal 24 of the power source 20. In place of the direct current type power source, a pulsating current can be used to effect a bond. An alternating current can also be used, particularly in the case of a glass having a symmetrical potential distribution characteristic, as will be referred to hereinafter. Electrical power for the platen 18 is provided across a set of terminals 30 and 32. Other techniques for heating the assembly can be employed. For example, the platen 18 can be heated by gas flames, or by induction heating techniques, or the assembly can be heated in an oven. Generally, a voltage of about 100–2,000 volts can be employed for a time ranging from a few seconds to ten minutes or longer, depending upon the materials and temperature. The higher the temperature, the quicker the bonding operation. A current of about 10–1,000 microamperes is passed across interface 16, the time of treatment being related inversely to the level of current.

After assembly, a Mallory type process is conducted wherein the assembly is heated so as to increase substantially the electrical conductivity of the insulator member 12, but below the softening points of the members 10 and 12. With the insulator member 12 having a softening point below that of the member 10, a convenient temperature range is about 200°–400° C below the softening point of the insulator member 12. For example, when the insulator member 12 is formed of a borosilicate glass, such as Pyrex, the assembly can be heated so that the temperature of the member 12 is in the range of about 150°–1,200° C, and preferably within the range of about 300°–700° C. Reference can be made to the Pomerantz patents, above referred to, for specific operative details the disclosures of which are incorporated herein.

The power source provides voltage and current for establishing an electric potential across the interface 16. With the terminal 22 positive with respect to the terminal 24, current will flow from terminal 22 through the contact 26, member 10, metal layer 14, insulator 12 and platen 18 to the terminal 24. The potential can be applied with a reverse polarity, the initial polarity being determined by the potential distribution characteristics of the insulator member 12, in accordance with the teachings of Pomerantz et al. U.S. Pat. No. 3,417,459. As will be referred to in more detail hereinafter, particularly with thin layers of insulator material, the polarity of the potential can be reversed during the bonding process.

At the interface 16, even with accurately machined surfaces, initial contact between the surfaces occurs only at a few points. Gaps are present at the interface which may have thicknesses anywhere from a few angstroms to several thousand angstroms, depending upon the surface finish of the materials. However, upon application of the electric potential at the temperatures hereinbefore indicated, the opposed surface areas are drawn closer into contact progressively closing the gaps and resulting in a continous, permanent strong bond and a hermetic seal throughout the interface 16. While the exact physical and/or chemical phenomena are not certain, it is believed that an electrostatic force is produced at and adjacent to the contacting points which serves to draw the components together. The insulator, having been heated sufficiently to render it electrically conductive, will also have been made more flexible and perhaps slightly plastic, enabling it to closely conform to the metal layer 14 surface.

The insulator member 12 is comprised of inorganic material normally having, at room temperature, a relatively high electrical resistivity. It may be one of the general classes of soft or hard glasses such as the borosilicate glass referred to above, fused quartz, Alumina, porcelain, sapphire, or the like, or other material which functions similiarly and has appropriate properties. Other such materials include silicon oxide, which may be deposited as a layer by evaporation of silicon monoxide and which may contain varying amounts of silicon dioxide, or which may be formed by oxidation on a substrate of silicon. Still another such material is silicon nitride.

The poor conductivity member 10 may also be formed of any of the substances above referred to as insulators, but additionally can include materials which are substantially more refractory than glass. For example, any of the materials known as ferrites can be used. Such materials are ferromagnetic oxides formed of mixed oxides of iron, zinc, silicon and nickel or manganese, and the like, and can be sintered to form solid bodies having good magnetic properties but poor electrical conductivity.

The metal layer 14 can be any of a variety of metals and alloys such as aluminum, platinum, beryllium, titanium, silver, gold, palladium, iron, nickel, chromium, tantalum, silicon, germanium and gallium arsenide. In particular, when a ferrite member is being bonded for purposes of producing a magnetic head, as will be described hereinafter, the layer 14 can be formed of a magnetic metal exemplified by an aluminum-iron-silicon alloy such as Sendust. Other magnetic materials can be found on pages E-101 to E-104 of the Handbook Of Chemistry And Physics, by the Chemical Rubber Company, Cleveland, Ohio, (48th edition, 1967), the disclosure of which is incorporated herein. The metal layer can be deposited by any of a number of known techniques for securing an intimate bonding thereof to the member 10, such as by sputtering, vacuum deposition, electroless metal plating, and the like, all of which techniques are well known to the art. A sputtering process is preferred as its high impact effect provides a particularly intimate bonding of the metal to the substrate and allows a wide choice of metals and alloys. It will be appreciated that a sputtered metal layer can be very thin, in the range of 0.1–200 microinches.

By using a Mallory type bonding process, some latitude is permitted in the relative coefficients of expansion of the members 10 and 12 and metal layer 14. In particular, with a very thin metal layer, any of the foregoing metals can be used and a difference in coefficients of expansion between the members 10 and 12 of 50% or more can be tolerated. Much larger mismatches can be tolerated with thin layers of insulator material such as may be used to form a gap between magnetic head pole tips. The coefficients of thermal expansion of the materials referred to herein are in many cases well known or can be readily determined. For a discussion of the thermal expansion of a variety of ferromagnetic oxide materials and glass bonding compositions therefore, reference can be made to Duinker et al. U.S. Pats. Nos. 3,024,318 and 3,145,453, the disclosures of which are incorporated herein.

Figure 2:
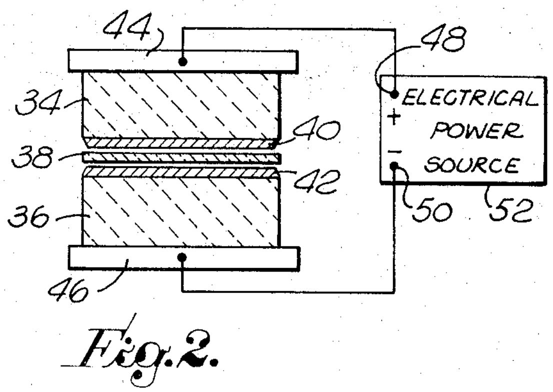
FIG. 2 is a diagrammatic, cross-sectional, partially exploded, side view illustrating the bonding of an insulator member between a pair of poor conductivity members, each having an intimately bonded metal surface thereon.

Referring to the FIG. 2, a method is illustrated for joining two members 34 and 36 of poor conductor material, such as ferrites, to the opposite surfaces of a spacer 38 of insulator material, such as glass. Each of the members 34 and 36 are initially formed with a surface layer of metal 40 and 42, respectively, and are then juxtaposed in surface contact relationship with opposite surfaces of the spacer 38. The assembly is disposed between contacting electrodes 44 and 46 which, in turn, are connected to respective terminals 48 and 50 of an electrical power source 52 as above described. The assembly is placed in an oven and heated to a temperature as described with respect to FIG. 1 to effect a permanent bonding of the components. When the two members 34 and 36 are to constitute a magnetic head, the glass spacer 38 can have a thickness in the range of 0.00025–0.005 inch.

Figure 3:
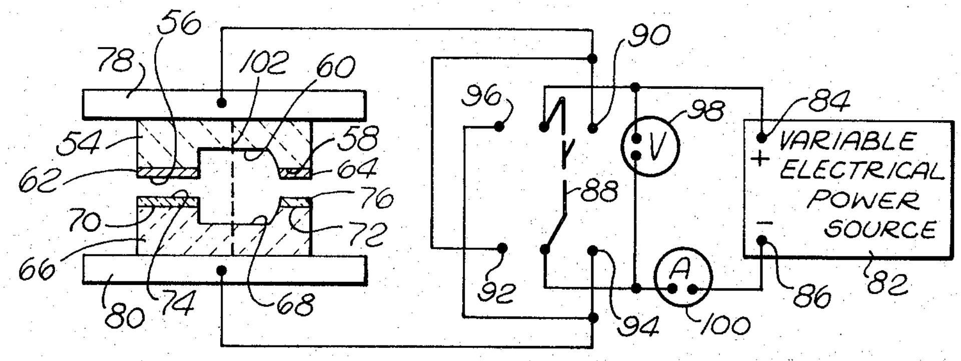
FIG. 3 is a diagrammatic, cross-sectional, partially exploded, side view illustrating the bonding of a pair of ferrite pole pieces having a metal surface on one face and a glass surface on the other face, and also illustrating a reversal of electric potential.

Referring to FIG. 3, there is illustrated a process for manufacturing a ferrite head having a gap of predetermined length formed of insulator material, such as glass. A first magnetic ferrite member 54 is formed with pole tip surfaces 56 and 58 on opposite sides of a channel portion 60. Initially, the surface of the ferrite member 54 is grooved to form channels 60 and the remaining surfaces are then accurately machined to a flatness deviation of about five microinches. A layer of Sendust is then sputtered thereon to a thickness of about 1–10 microinches. The sputtered metal defines metal contact surfaces 62 and 64 for the pole tips 56 and 58. A second ferrite member 66 is similarly machined to form a channel 68 and a layer of glass, such as Pyrex borosilicate glass, is sputtered onto the remaining machined surfaces to a thickness of about 40 microinches. A pair of pole tips 70 and 72 is thus provided, covered with respective layers 74 and 76 of glass and conforming in shape to the pole tips 56 and 58 of the other ferrite member 54.

The thickness of the sputtered glass can be controlled very accurately to be as thin as 5 microinches and as thick as desired, e.g., about 700 microinches. A preferred range is about 15–60 microinches. By using a Mallory type process, one can bond the glass layers 74 and 76 to the metal layers 56 and 58 without melting the glass layers 74 and 76. Accordingly, one can fabricate a magnetic head having gap lengths which are determined solely by the thickness of the glass layers 74 and 76. Nonmagnetic metals can be used in place of the Sendust with an increase in magnetic gap length, the increase corresponding to the thicknesses of the metal layers. By using a magnetic metal, the magnetic gap length is limited to the thickness of the sputtered glass.

The ferrite members 54 and 66 are juxtaposed with the glass and metal layers in surface contact relationship and a pair of electrodes 78 and 80 are disposed in contact on opposite sides of the assembly. An electric potential is applied across the assembly by means of a variable electrical power source 82 connected by positive and negative terminals 84 and 86, respectively, to a double throw switch 88. The electrodes 78 and 80 are each connected to spaced contacts 90, 92 and 94, 96, respectively, so that when the double throw switch 88 is in one position, across contacts 90 and 94, current will flow from the positive terminal 84 through the ferrite member 54, metal layers 62 and 64, glass layers 74 and 76, and ferrite member 66 to the negative terminal 86. When the double throw switch 88 is moved to bridge the contacts 92 and 96, current will flow from the positive terminal 84 through the ferrite member 66, glass layers 74 and 76, metal layers 62 and 64, and ferrite member 54 to the negative terminal 84. Accordingly, depending upon the position of the double throw switch 88, one can apply an electric potential across the assembly with current flowing in either direction.

The electrical power source 82 is variable and can be controlled to impart a desired voltage gradient across the assembly as monitored by a voltmeter 98 connected in parallel to the circuit. The amount of current flow can be monitored by a microammeter 100 connected in series with the power source.

The assembly is placed in an oven and heated to about 500° C whereupon a voltage is applied across the terminals 90 and 94 so as to apply a negative potential to the glass layers 74 and 76. The voltage is increased while observing the micrometer 100 until it is found that the current increases to a maximum magnitude and then drops substantially. At this point, the assembly can be removed from the oven and cooled to obtain a bonded ferrite head.

In accordance with a further embodiment, a modified bonding technique can be employed, particularly when the glass layers 74 and 76 have very thin dimensions as referred to herein. In this embodiment, following the observed decrease in current, the polarity is reversed by throwing the double pole switch 88 to connect the contacts 92 and 96, initially at a low voltage. Upon an increase in the voltage it is found that the magnitude of current observed is substantially restored. The reversed polarity voltage can be maintained for an additional few minutes and thereafter the leads are disconnected and the assembly removed and cooled. Alternatively, the voltage can be again reversed and it will be generally observed that a substantial current flows but which quickly decreases following a modest increase in voltage.

Following the foregoing polarity reversal steps, the bonded ferrite structure is found to be formed with an extremely tenacious bond between the metal and glass layers. Upon destruction, the ferrite portions are found to break away without cleavage at the juncture of glass and metal.

Figure 4:
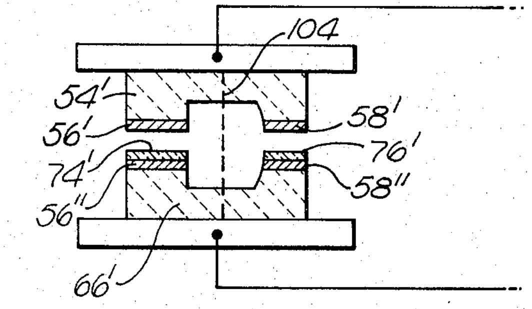
FIG. 4 is an alternative embodiment of FIG. 3 in which the glass surface of one of the pole pieces is deposited onto a metal surface of that pole piece.

Referring to FIG. 4, an alternative embodiment is illustrated which is similiar to that of FIG. 3 but wherein both ferrite members 54' and 66' are initially formed with sputtered metal layers 56',58' and 56'',58''. The glass gap material is sputtered onto the metal layers of one of the ferrite members 66' to form glass layers 74' and 76' thereon. The procedure for bonding of the assembled components is the same as in FIG. 3.

Referred to both FIGS. 3 and 4, the resulting ferrite heads can be cut along lines 102 and 104 to divide each assembly into two parts, each part being shaped to provide a magnetic head structure. Depending upon the width of each head, each part can thereafter be cut to form a multiple number of magnetic heads. It will be appreciated that as a result of the bonding method employed herein, the gap length of each head is exactly the same as the other and precisely controlled. Moreover, by using the glass sputtering process a smaller gap length can be obtained than heretofore practical.

Figure 5:
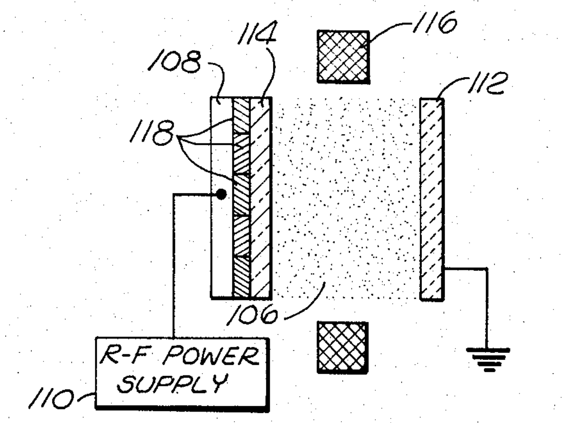
FIG. 5 is a diagrammatic, cross-sectional view illustrating a radio-frequency sputtering process incorporating a cooled target.

Referring to FIG. 5, another preferred manner of practicing the method of the present invention is illustrated. It has been found that when sputtering the glass gap material onto the ferrite pole tip face, a higher sputtering rate can be achieved without damaging the glass target during sputtering. In the illustration, a sputtering technique is shown wherein low pressure gas 106, such as Argon, is ionized by the current flowing between a radio-frequency driven cathode 108 and a ferrite substrate 112. In the usual operation, a glass target 114 is juxtaposed in direct contact with the cathode 108, whose negative charge pulls ions from the argon plasma. These ions dislodge or sputter atoms from the target 114 which land as a film on the substrate 112, guided by a magnetic field developed by a coil 116.

In accordance with the present embodiment, the target 114 is cooled during sputtering by disposing a plurality of heat conductive members 118 between the cathode 108 and the glass target 114. Although it is not desired to be limited to any particular theory of operation, the plurality of heat conductive members 118 appear to provide a multiplicity of surface contacts between the cathode 108 and target 114 enabling a more efficient dissipation of heat from the target 114. While it is not entirely understood, the film or layer of glass deposited on the substrate 112 appears to be more tenaciously bonded thereto when deposited from a cooled target as hereinabove described than from a target used in the usual manner. As conductive members, one can utilize strips of indium about 0.010–0.100 inch thick, a convenient thickness being 0.020 inch. Other materials which can be used include aluminum, steel alloys, gold and silver.

The following examples will further illustrate the processes.

EXAMPLE 1

A ferrite member was lapped flat and polished to a flatness deviation of about 2 microinches and a layer of about one microinch of Sendust was sputtered onto the lapped surface. The ferrite member was placed in metal-glass contact with a slide of Pyrex 7740 borosilicate glass, about 0.05 inch. thick. The assembly was supported between negative and positive electrodes connected to an electrical source, with the negative electrode in contact with the glass member, and the assembly was placed in an oven heated to about 500° C.

The voltage was increased slowy to about 600 volts while maintaining the current at just below 600 microamperes. The current was observed to increase as the voltage increased and then to drop. After the voltage reached 600 volts, the current dropped gradually to approximately 80 microamperes, the entire process taking about 5 minutes. The resultant assembly was integrally joined as one piece.

EXAMPLE 2

The experiment of Example 1 was repeated except that approximately 40 microinches of Sendust was sputtered onto the ferrite member and the glass member was about 0.005 inch thick. The assembly was heated to 500° C and voltage applied as before, but raised slowly to 350 volts, keeping the current just below 600 microamperes. At 350 volts, the microameter showed signs of breakdown occurring (needle twitching) and at this point the polarity was reversed and voltage was applied at a lower magnitude. Just 100 volts were required to cause the current to rise to 600 microamps. After a few minutes, the voltage polarity was again reversed. The current was observed to drop quickly after a small increase in voltage. After cooling, the assembly was found to be integrally joined. Upon destruction, the ferrite portions broke away on one side of the test piece and the glass broke away on the other side, but the bond did not break.

EXAMPLE 3

A pair of ferrite members were lapped and polished to a flatness deviation of about 5 microinches. One of the members was placed in a sputtering system and Pyrex 7740 borosilicate glass was deposited thereon to a thickness of approximately 40±4 microinches. A film of aluminum was sputtered onto the surface of the other ferrite member to a thickness of about 8–10 microinches. The members were juxtaposed in metal-glass surface contact relationship, in accordance with the procedure as described with respect to FIG. 3. The assembly was heated in an oven to 500° C and voltage applied. Polarity of the voltage was positive with respect to the metal surface and was increased slowly to about 120 volts, keeping the current just below 600 microamperes. After a few minutes, the current dropped substantially and the microameter indicated the beginning of a voltage breakdown. The polarity of the voltage was thereupon reversed and the voltage increased from 0 to about 12 volts at which time the current was found to be about 600 microamperes. The current then dropped very slowly, allowing the voltage to be turned up to about 50 volts whereupon the microameter indicated a further voltage breakdown. The polarity was again reversed and the voltage increased from 0 to about 120 volts with an increase in current to just below 600 microampers. The current then dropped substantially following which the voltage was turned off and the assembly allowed to cool.

The resulting members appeared to be bonded together tightly and could not be twisted apart by hand. Impacting the bonded assembly resulted in breaking off a portion of the ferrite, but the bond remained intact. A gap surface was lapped and polished and the gap observed to be a consistent 49 ±5 microinches.

EXAMPLE 4

The procedure of Example 3 can be repeated substituting a Sendust layer for the aluminum layer so as to limit the effective magnetic gap to the thickness of the layer of glass.

I claim:

1. A method for joining a first member of inorganic insulator material to a second member of material having poor conductivity, comprising the steps of:
- depositing metal on said second member to form an intimately bonded metal surface thereon;
- juxtaposing a surface of said first member and said metal surface in surface contact relationship;
- heating said juxtaposed surface to a temperature below the softening point of said members sufficiently to increase substantially the electrical conductivity of said insulator material; and
- applying an electric potential across the juxtaposed surfaces sufficient to produce a finite electric current therethrough without rendering said members molten thereby to produce an electrostatic field across said surfaces for a time sufficient to effect a decrease in magnitude of said finite electric current per volt of applied potential and thereafter reversing the polarity of said electric potential at least once at a magnitude sufficient to produce a finite electric current through said juxtaposed surfaces of greater intensity than said decreased current magnitude, to effect a bond between said juxtaposed surfaces.

2. A method according to claim 7 wherein said depositing step comprises sputtering said metal onto first and second members.

3. A method according to claim 7 wherein said first and second members each comprise a ferrite.

4. A method according to claim 3 wherein said metal comprises a magnetic metal alloy.

5. A method according to claim 1 wherein said first member has a thickness of about 5–100 microinches.

6. A method for joining together first and second members, each having poor conductivity, with a conforming member of inorganic insulator material therebetween, comprising the steps of:
- depositing metal on each of said first and second members so as to form an intimately bonded metal surface on each first and second member;
- thereafter juxtaposing said first and second members on opposite sides of said conforming member in metal surface contact relationship therewith;
- heating said juxtaposed surfaces to a temperature below the softening points of said members sufficiently to increase substantially the electrical conductivity of said insulator material; and
- applying an electric potential across the juxtaposed surfaces sufficient to produce a finite electric current therethrough without rendering said members molten thereby to produce an electrostatic field across said surfaces for a time sufficient to effect a decrease in magnitude of said finite electric current per volt of applied potential and thereafter reversing the polarity of said electric potential at least once at a magnitude sufficient to produce a finite current through said juxtaposed surfaces of greater intensity than said decreased current magnitude to effect a bond therebetween.

7. A method for joining together first and second members each having poor conductivity, with a gap therebetween defined by inorganic insulator material, comprising the steps of:
- depositing metal on at least one of said members so as to form an intimately bonded metal surface thereon;
- depositing said inorganic insulator material on the other of said members so as to form an intimately bonded inorganic insulator surface thereon;
- thereafter juxtaposing said metal surface and inorganic insulator surface in surface contact relationship;
- heating said juxtaposed surfaces to a temperature below the softening point of said insulator material and members sufficiently to increase substantially the electrical conductivity of said insulator material; and
- applying an electric potential across the juxtaposed surfaces sufficient to produce a finite electric current therethrough without rendering said insulating material or members molten thereby to produce an electrostatic field across said surfaces to effect a bond therebetween.

8. A method according to claim 7 including the step prior to depositing said inorganic insulator material, of depositing metal on the other of said first and second members so as to form an intimately bonded metal surface on said other member, said inorganic insulator material being deposited thereon.

9. A method according to claim 7 wherein said inorganic insulator material is deposited by sputtering from a target thereof juxtaposed with a radio-frequency electrode.

10. A method according to claim 9 including the step of cooling said target during sputtering.

11. A method according to claim 10 in which said cooling step comprises disposing at least one heat conductive member between said radio-frequency electrode and said target to conduct heat from said target during said sputtering.

12. In a method for manufacturing a magnetic head having at least one pole tip pair, the tips of each pair separated by a non-magnetic gap of desired length, the steps comprising:

depositing a layer of metal on a planar surface portion of at least one of a pair of ferrite members to form an intimately bonded metal surface thereon;

depositing inorganic insulator material on at least a portion of a planar surface of the other of said pair of said ferrite members to form an intimately bonded layer of insulator thereon of a thickness together with the magnetically effective thickness of said metal, if any, substantially equal to said desired gap length;

juxtaposing said metal surface and insulator material surface in surface contact relationship;

heating said juxtaposed surfaces to a temperature below the softening point of said insulator material to increase substantially the electrical conductivity of said insulator material; and applying an electric potential across the juxtaposed surfaces sufficient to produce a finite electric current therethrough without rendering said insulator material molten thereby to produce an electrostatic field across said surfaces to effect a bond therebetween.

13. A method according to claim 12 including the step, prior to depositing said inorganic insulator material, of depositing metal on the other of said ferrite members to form an intimately bonded metal surface on said other of said pair, said inorganic insulator material being deposited thereon.

14. A method according to claim 12 wherein said inorganic insulator material is deposited in direct contact with said other of said ferrite members.

15. The method according to claim 12 wherein said inorganic insulator material is deposited by sputtering from a target thereof juxtaposed with a radio-frequency electrode.

16. A method according to claim 15 including the step of cooling said target during sputtering.

17. A method according to claim 16 in which the step of cooling comprises disposing at least one heat conductive member between said radio-frequency electrode and said target to conduct heat from said target during said sputtering.

18. The method according to claim 12 in which said metal comprises a magnetic metal alloy.

19. A method according to claim 12 wherein said metal is deposited by sputtering.

20. A method according to claim 12 wherein said electric potential is applied for a time sufficient to effect a decrease in the magnitude of said finite electric current per volt of applied potential and is thereafter reversed in polarity at least once sufficient to produce a finite electric current through said juxtaposed surfaces of greater magnitude than said decreased current magnitude.

21. A method according to claim 20 wherein the thickness of said insulator layer is about 5–100 microinches.

22. In a process wherein an electric potential is applied across juxtaposed contacting surfaces of a first member of inorganic insulator material and a second member of inorganic material while said insulator material is heated below its softening point sufficiently to increase substantially its electrical conductivity to produce a finite electric current through, and to thereby bond, said contacting surfaces, the improvement comprising applying said electric potential for a time sufficient to effect a decrease in the magnitude of said finite electric current per volt of applied potential and thereafter reversing the polarity of said electric potential at least once at a magnitude sufficient to produce a finite electric current through said juxtaposed surfaces of greater magnitude than said decreased current magnitude.

23. A method according to claim 22 wherein said member of inorganic insulator material has a thickness of about 5–100 microinches.

24. The method according to claim 22 in which the surface of said second member is formed of metal.

25. A method according to claim 22 in which said second member comprises a body of material having poor conductivity and having a layer of metal thereon defining said second member surface.

26. A method according to claim 25 in which said body is formed of a ferrite.

* * * * *